Feb. 20, 1934.　　　　J. W. CARTHEW　　　　1,947,695
PROCESS OF MAKING FLEXIBLE SHAFT COUPLINGS
Filed Sept. 10, 1930　　　3 Sheets-Sheet 1
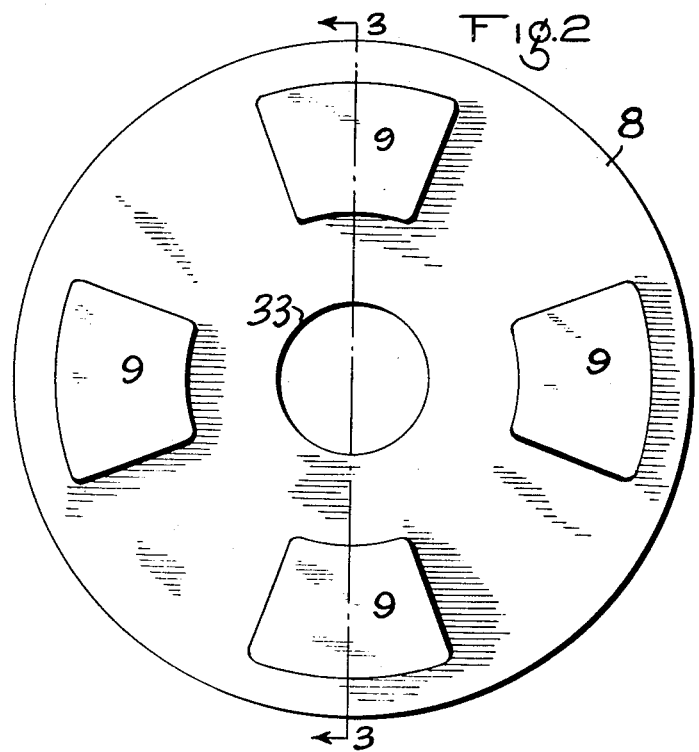
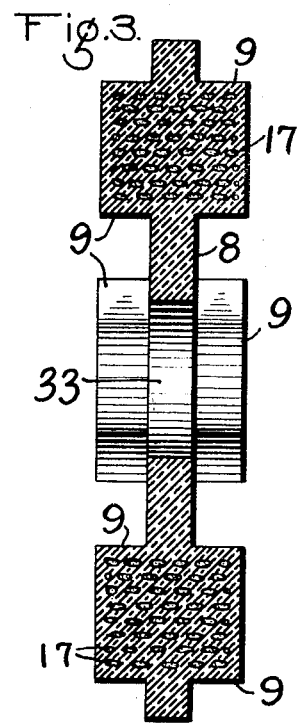
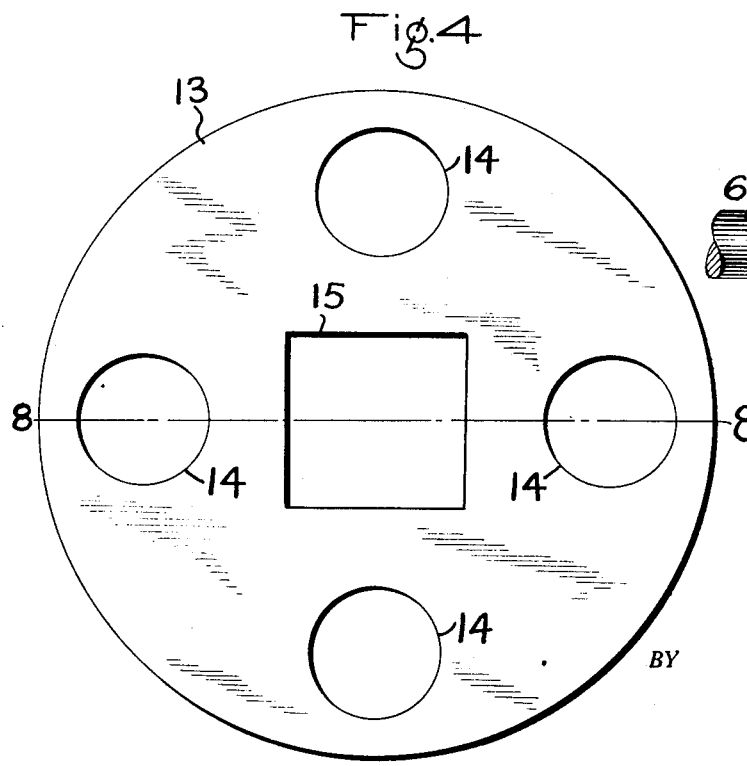
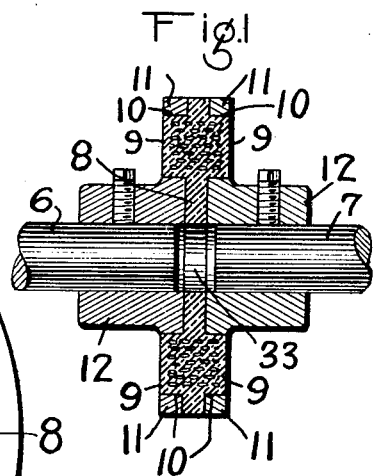
INVENTOR.
JOHN W. CARTHEW
BY Wm. M. Cady
ATTORNEY.

Feb. 20, 1934.  J. W. CARTHEW  1,947,695
PROCESS OF MAKING FLEXIBLE SHAFT COUPLINGS
Filed Sept. 10, 1930  3 Sheets-Sheet 2
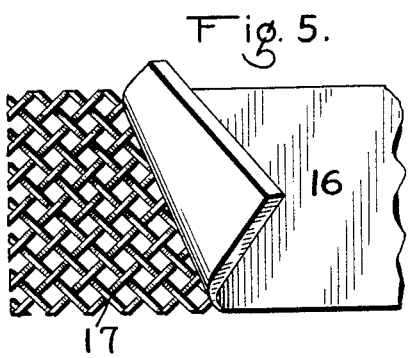
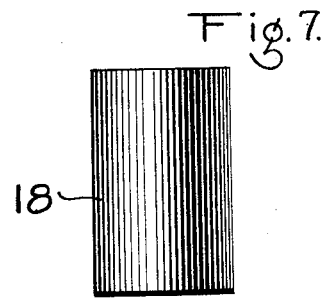
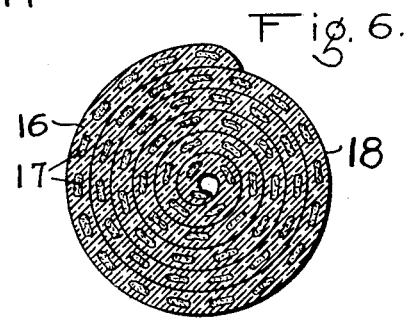
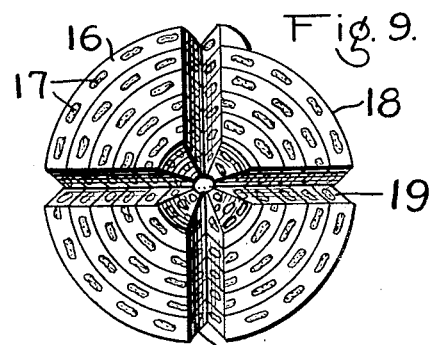
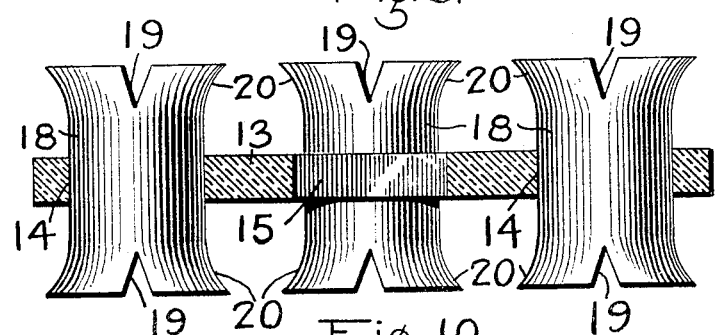
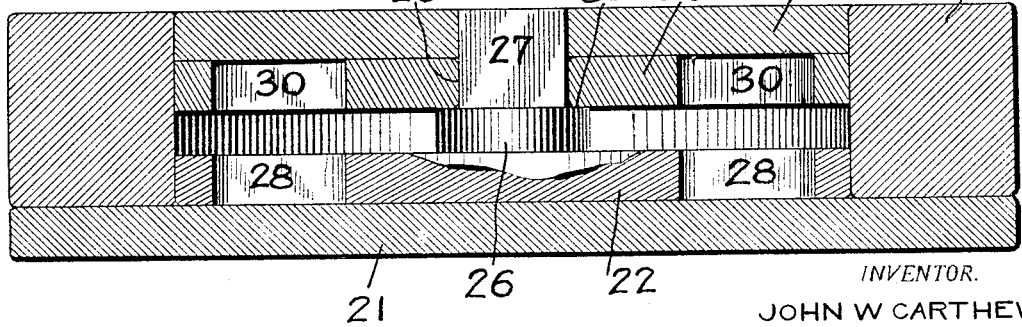
INVENTOR.
JOHN W CARTHEW
BY
Wm. M. Cady
ATTORNEY Feb. 20, 1934.    J. W. CARTHEW    1,947,695
PROCESS OF MAKING FLEXIBLE SHAFT COUPLINGS
Filed Sept. 10, 1930    3 Sheets-Sheet 3
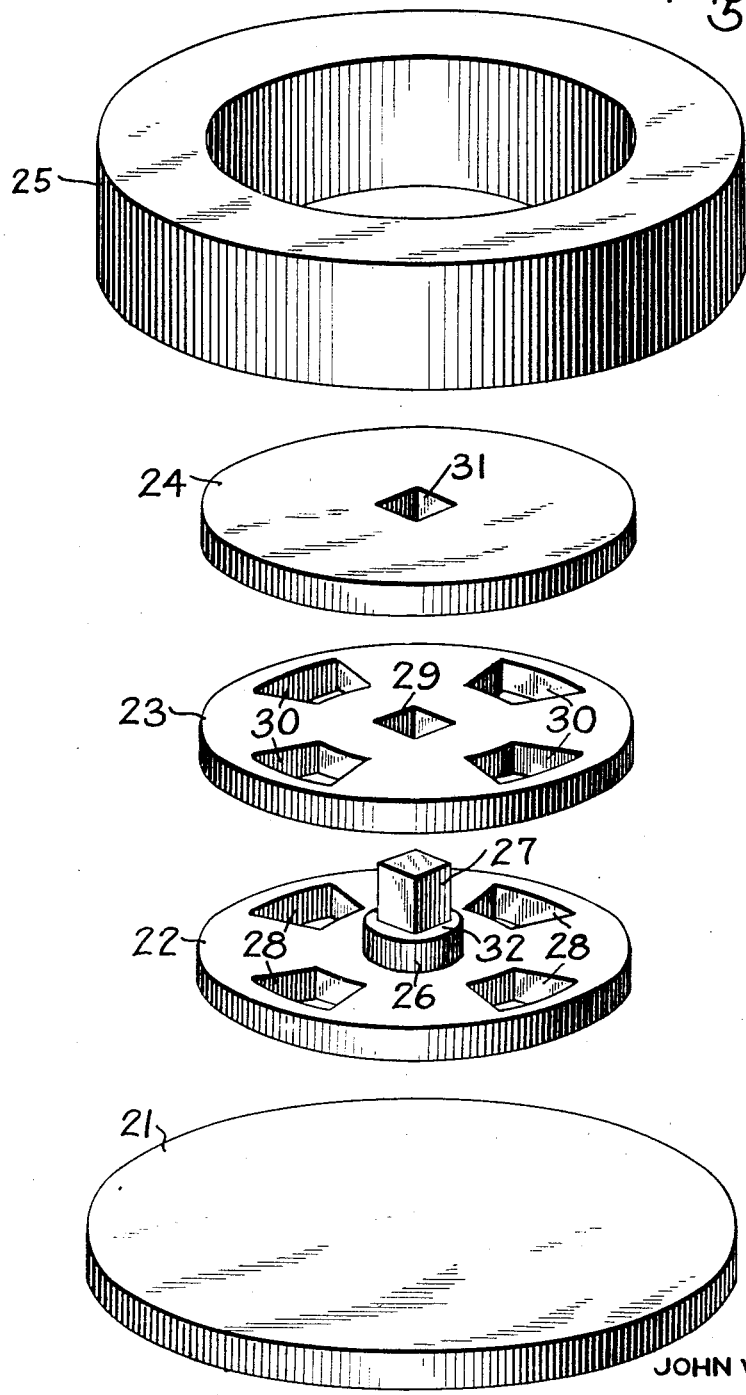
INVENTOR.
JOHN W. CARTHEW
BY
Wm. M. Cady
ATTORNEY.

Patented Feb. 20, 1934

1,947,695

UNITED STATES PATENT OFFICE 1,947,695

PROCESS OF MAKING FLEXIBLE SHAFT COUPLINGS

John W. Carthew, Wilmerding, Pa., assignor to The Westinghouse Air Brake Company, Wilmerding, Pa., a corporation of Pennsylvania Application September 10, 1930
Serial No. 480,889

3 Claims. (Cl. 18—59)

This invention relates to flexible shaft couplings.

An object of the invention is to provide an improved flexible shaft coupling and the process for making same.

Another object of the invention is to provide a flexible shaft coupling constructed from an oil proof rubber composition.

Another object of the invention is to provide an improved flexible shaft coupling of the character mentioned which is simple in construction, and reliable and exact in function under all conditions of service.

The invention also comprises certain new and useful improvements in the construction, arrangement, and combination of the several parts of which it is composed, as will be hereinafter more fully described and claimed.

In the accompanying drawings; Figure 1 is a view illustrating the manner of applying a coupling constructed according to the invention to the ends of two shafts; Fig. 2 is a face view of the coupling; Fig. 3 is a section taken on the line 3—3 of Fig. 2; Fig. 4 is a plan of the blank of composition material used for making the body portion of the coupling; Fig. 5 is a view illustrating the construction of the strip of material employed in making the rolls illustrated in Figs. 6, 7, 8 and 9; Fig. 6 is an enlarged section of one of the rolls used for forming the lugs on the coupling; Fig. 7 is a side view of the roll shown in Fig. 6, the same being shown on the same scale as Fig. 5; Fig. 8 is a section taken on the line 8—8 of Fig. 4, showing the rolls associated with the blank preparatory to molding; Fig. 9 is an end view the same scale as Fig. 6 of one of the rolls shown in Fig. 8; Fig. 10 is a section of the mold employed in forming the coupling; and Fig. 11 is a detached perspective view of the mold.

Referring to Fig. 1, when two shafts 6 and 7, in substantial axial alinement, are to be connected, it is the practice to employ a flexible coupling 8, in order to obviate rigidity and thereby compensate for any small differences in alinement which may exist at the time of installation or which may develop later from any cause.

Couplings of this type are usually made in the form of discs having lugs or projections 9 formed on the opposite sides of the discs. The discs are adapted to be interposed between the ends of the shafts with the lugs or projections 9 inserted in correspondingly formed openings 10 in flanges 11 of hubs 12 fixed to the ends of the shafts. This permits the disc to act as a driving element for transmitting power from one shaft to the other.

Heretofore, leather has been extensively used in the manufacture of flexible shaft couplings. The advantage in the use of leather, rather than a metallic driving element, is that leather is noiseless under conditions where the direction of rotation is sharply reversed; where in starting or stopping, vibrations may be set up due to changing strains caused by misalinement or to bearing wear; or where there may be more or less floating of one shaft with respect to the other. Moreover, leather is an electric insulator, which is an advantage with electric drives.

However, leather suitable for the severe service to which flexible shaft couplings are subject is constantly becoming more difficult to obtain and the cost is continually increasing, and furthermore, leather couplings have always been more or less unsatisfactory, due to their deterioration through the action of lubricating oil, moisture, and foreign matter which are usually present on the shafts.

I have provided an improved non-leather flexible shaft coupling and process for making same which I will now describe.

By my invention, the body of the coupling 8 is preferably formed from a suitable rubber composition, and the lugs 9 projecting from the opposite sides or faces of the coupling are suitably reinforced by means of suitable fabric which is embedded in the rubber composition. The lugs 9 may be of any size and configuration, and any number of lugs may be provided, depending upon the amount of power to be transmitted.

Ordinary non-oil proof rubber would not be satisfactory for use in the coupling, since lubricating oil, moisture, and other foreign matter, usually present on and around the shafts to which the coupling is adapted to be attached, would soon disintegrate and destroy the coupling, and neither oil proof nor non-oil proof rubber would have the required strength to resist breaking, unless a reinforcing material be included in the coupling.

An oil proof rubber composition has been developed which is capable of withstanding the action of oil, etc., but it has been found upon test that such oil proof rubber composition is substantially non-adhesive, that is to say, it will not form a reliable union with other substances, such as fabric reinforcing material. On the other hand, this oil proof rubber composition still retains the cohesive property of ordinary rubber, so that one portion of the material may be united with another portion.

With my invention, I am enabled to employ oil proof rubber composition and at the same time provide a coupling which is reinforced to resist wear and breakage.

According to my invention, the body of the coupling 8 is formed from suitable oil proof rubber composition. The rubber composition used in forming the body of the coupling may be reinforced if so desired. However, the lugs 9, which are integrally formed with the body portion of the coupling 8, are suitably reinforced with a core of fabric in the manner to be hereinafter more fully described.

In manufacturing the improved coupling, a substantially circular blank 13 is cut from a sheet of the oil proof rubber composition, as shown in Fig. 4, the sheet of rubber having the desired thickness. The blank 13 is adapted to form the body portion of the finished coupling and openings 14 are formed therein at the positions of the lugs 9. In the present instance, the openings 14 are shown as being round, but it is to be understood that these openings may be of any desired configuration. Another opening 15 is formed centrally of the blank 13, for a purpose to be hereinafter described.

The lugs 9 of the coupling are formed from rolls of reinforced material constructed in the following manner.

The oil proof rubber composition in the dough state is rolled out into sheets. Sheets of reinforcing fabric having open meshes and preferably of cotton are also provided and then a sheet 16 of rubber composition and a sheet 17 of fabric are passed through heated calender rolls, so that the substance of the rubber composition sheet is forced through the meshes of the fabric, as shown in Figs. 6 and 9.

The calendered sheets produced as above described are then cut into strips on a bias cutter, so that the threads of the fabric run diagonally with respect to the strip, as shown in Fig. 5.

The strips of the material are then cut into suitable lengths, and each length of the strip material is then rolled into convolute form to provide a substantially cylindrical body 18, as shown in Figs. 6 and 7.

The roll 18 is thus composed of the rubber composition in which is embedded the open mesh fabric 17, and since a single strip of the fabric is used in each roll, a substantial reinforcement is provided for the rubber composition used in forming each of the lugs 9 of the coupling.

A roll 18 thus provided, is then inserted in each of the openings 14 of the rubber composition disc 13, Fig. 4, with the ends of the roll projecting substantially equidistantly from both sides of the disc. As shown, the rolls 18 are preferably made considerably longer than the height of the lugs 9 of the finished coupling, so that when the article is being molded, the mold cavity will be completely filled with the material.

After the rolls 18 have been positioned in the disc 13, the projecting ends of the rolls are diametrically cut, as indicated at 19, Figs. 8 and 9, to provide a plurality of slits which extend downwardly into the body of the rolls a suitable distance from the ends thereof. The slitted portions of the rolls 18 are then spread outwardly, as indicated at 20, Fig. 8. The article is now ready to be molded.

As shown in Figs. 10 and 11, the mold may comprise a bottom plate 21, male portion 22, female portion 23, top plate 24, and housing 25.

The male portion 22 of the mold is provided with a central upstanding stem 26, the lower portion of which is cylindrical in form and the upper portion of which is rectangular, as indicated at 27. When the disc 13 of the rubber composition is positioned on the male portion 22, preparatory to molding, the lower cylindrical portion of the stem 26 is disposed within the opening 15 of the disc so as to form the central opening 33 in the coupling (see Figs. 2 and 3). Openings 28 are formed in the male portion 22 and are spaced from the stem 26. The openings 28 have the configuration it is desired to impart to the lugs 9 projecting from one side of the coupling.

The female portion 23 is provided with a central rectangular opening 29 and a plurality of openings 30 which surround the central opening 29. The openings 30 have the configuration it is desired to impart to the lugs 9 projecting from the side of the coupling opposite to the side facing the male portion 22 of the mold.

In the present instance the openings 28 and 30 are shown as having the same configuration, but it is to be understood that if so desired, the openings may have any shape desired.

By employing a rectangular stem 27 on the male portion 22 and a correspondingly formed opening 29 in the female portion 23, and by disposing the openings 30 relatively to the sides of the opening 29 so that these openings are positioned to correspond with the location of the openings 28, when the female portion 23 is superposed on the male portion 22, as shown in Fig. 10, the openings 30 will register with the openings 28 and the ends of the rolls 18 can thus be inserted through the alined openings.

The top plate 24 is provided with a central rectangular opening 31 for receiving the upper end of the portion 27 of the stem of the male portion 22 of the mold.

A disc 13 carrying the several rolls 18, is next placed between the male portion 22 and the female portion 23, with the projecting ends of the rolls centered in the alined openings 28 and 30. The parts are then assembled with the bottom plate 21, top plate 24, and housing 25.

The mold is then subjected to pressure by means of a pneumatic or hydraulic press. When pressure is first applied to the mold, the slit ends of the rolls 18 will be further spread out, and as the pressure is increased, the female portion 23 will be forced toward the male portion 22 and the main body portions of the rolls will be compressed so as to completely fill the mold cavity. The movement of the female portion 23 toward the male portion 22 will be arrested when the female portion engages shoulder 32 between the cylindrical and rectangular portion 27 of the stem 26, as shown in Fig. 10.

Finally the mold is placed in a vulcanizer in order to vulcanize the coupling. After vulcanization, the coupling is removed from the mold and the edges of the coupling trimmed smooth, after which the coupling is ready for service.

During vulcanization the exposed edges of the fabric 17 used for reinforcing the lugs 9 will be covered with a layer of rubber composition, as shown in Fig. 3, so that in the finished coupling, there will be no fabric edges, which otherwise might be liable to absorb oil, moisture, and other injurious foreign matter. In this way the lugs of the coupling will be suitably reinforced with cores of reinforcing fabric which are disposed transversely of the body of the coupling.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The process of forming a disc member for a flexible shaft coupling which consists in providing a perforated disc of rubber composition, inserting rolls formed from sheet rubber composition reinforced with fabric in the perforations, in slitting the ends of said rolls to facilitate displacement of the material of the rolls, in placing said disc with the rolls projecting from opposite sides thereof in a mold, in then applying pressure to said mold, and in then vulcanizing the coupling in the mold.

2. The process of forming a disc member for a flexible shaft coupling which consists in providing a perforated disc of rubber composition, inserting in the perforations, cylinders comprising rubber composition in which fibrous strands are embedded, so that their ends project from opposite sides of the disc, in slitting the ends of said cylinders to facilitate displacement of the material thereof, in placing said disc with the cylinders projecting from opposite sides thereof in a mold, in then applying pressure to said mold and in then vulcanizing the coupling in the mold.

3. The process of forming a disc member for a flexible shaft coupling which consists in providing a perforate disc of rubber composition, in inserting in the perforations, cylinders comprising rubber composition in which fibrous strands are embedded, so that their ends project from opposite sides of the disc, in placing said disc with the cylinders projecting from opposite sides thereof in a mold, in compressing the ends of the cylinders inwardly so as to laterally expand the material thereof into engagement with the walls of the mold for giving the disc its final shape, and in then vulcanizing the coupling in the mold.

JOHN W. CARTHEW.